United States Patent
Croghan et al.

(10) Patent No.: US 9,426,574 B2
(45) Date of Patent: Aug. 23, 2016

(54) AUTOMATIC AUDIO SOURCE SWITCHING

(75) Inventors: Frank Croghan, Millbury, MA (US); Hilmar Lehnert, Framingham, MA (US); Daniel M. Morton, Arlington, MA (US); Pelham Norville, Framingham, MA (US); Klaus Hartung, Hopkinton, MA (US); Wade P. Torres, Attleboro, MA (US)

(73) Assignee: Bose Corporation, Framingham, MA (US)

( * ) Notice: Subject to any disclaimer, the term of this patent is extended or adjusted under 35 U.S.C. 154(b) by 1428 days.

(21) Appl. No.: 12/727,595

(22) Filed: Mar. 19, 2010

(65) Prior Publication Data
US 2011/0228944 A1   Sep. 22, 2011

(51) Int. Cl.
| | |
|---|---|
| *H04R 5/00* | (2006.01) |
| *H02B 1/00* | (2006.01) |
| *H04R 5/04* | (2006.01) |
| *H04N 5/60* | (2006.01) |
| *H04N 21/4363* | (2011.01) |
| *H04N 7/088* | (2006.01) |
| *G08C 23/04* | (2006.01) |
| *H04N 5/445* | (2011.01) |
| *G06F 3/16* | (2006.01) |

(52) U.S. Cl.
CPC .. *H04R 5/04* (2013.01); *H04N 5/60* (2013.01); *H04N 21/43635* (2013.01); *G06F 3/162* (2013.01); *G08C 23/04* (2013.01); *H04N 5/44543* (2013.01); *H04N 7/088* (2013.01); *H04R 2420/01* (2013.01); *H04R 2420/03* (2013.01)

(58) Field of Classification Search
USPC ............. 381/17, 123, 56, 58, 11, 80, 81, 2, 7, 381/12; 348/552, 738
See application file for complete search history.

(56) References Cited

U.S. PATENT DOCUMENTS

| | | | | | |
|---|---|---|---|---|---|
| 4,488,179 | A | * | 12/1984 | Krüger | H04B 1/205 345/158 |
| 4,625,235 | A | * | 11/1986 | Watson | H04N 7/088 348/476 |
| 6,052,471 | A | * | 4/2000 | Van Ryzin | 381/85 |
| 6,678,014 | B1 | * | 1/2004 | Jin et al. | 348/738 |
| 7,212,253 | B1 | * | 5/2007 | de Groot et al. | 348/738 |
| 7,859,599 | B2 | * | 12/2010 | Ogusu | 348/738 |
| 7,903,751 | B2 | * | 3/2011 | Fiesel et al. | 375/260 |

(Continued)

FOREIGN PATENT DOCUMENTS

| | | |
|---|---|---|
| EP | 0866638 A2 | 9/1998 |
| EP | 1853086 A1 | 11/2007 |
| JP | 2006295698 A | 10/2006 |

OTHER PUBLICATIONS

International Search Report and Written Opinion dated Jun. 27, 2011 for Int. Appln. No. PCT/US2011/027382.

*Primary Examiner* — Davetta W Goins
*Assistant Examiner* — Kuassi Ganmavo
(74) *Attorney, Agent, or Firm* — Bose Corporation

(57) ABSTRACT

A method for automatically switching an audio source includes the steps of receiving an audio signal from a video display device, and receiving a digital audio signal from one of a plurality of audio/video source devices which each can supply audio and video information to the video display device. The digital audio signal is compared with the audio signal from the video display device. The digital audio signal is output to a supplemental audio system of the video display device when the comparing step indicates that the digital audio signal and the audio signal from the video display device contain substantially similar audio programs.

7 Claims, 4 Drawing Sheets

(56) References Cited

U.S. PATENT DOCUMENTS

| | | |
|---|---|---|
| 2002/0131611 A1* | 9/2002 | Hoover et al. ................ 381/123 |
| 2003/0108227 A1* | 6/2003 | Philomin ........... G06K 9/00006 382/124 |
| 2004/0031050 A1* | 2/2004 | Klosterman ....... H04N 5/44543 725/39 |
| 2005/0096899 A1 | 5/2005 | Padhi et al. |
| 2007/0279248 A1* | 12/2007 | Matsumoto et al. ..... 340/825.72 |
| 2008/0094524 A1* | 4/2008 | Schobben ..................... 348/738 |
| 2008/0235620 A1* | 9/2008 | Musschebroeck .... G06F 3/0482 715/810 |
| 2008/0267413 A1* | 10/2008 | Faller ................................ 381/1 |
| 2009/0046210 A1* | 2/2009 | Sakamoto et al. ............ 348/738 |

* cited by examiner

AUTOMATIC AUDIO SOURCE SWITCHING

BACKGROUND

This disclosure relates to an audio/video system and, more specifically to a video display with a supplemental audio system.

Many modern televisions ("TVs") have significant audio/video ("A/V") source switching capabilities. As a result, customers often choose to connect their A/V sources (e.g. cable box, DVD player) directly to the TV using, for example, HDMI cables. This eliminates the need for an external home theater A/V receiver to switch audio/video signals. The HDMI inputs and audio outputs of TVs are technically capable of supplying a multichannel audio output (e.g. Dolby Digital 5.1) from the TV to a supplemental audio system being used with the TV. However, the audio signal available at a TV's audio output is often not multichannel. Instead, the audio output from the TV is typically a down-mixed 2 channel signal (e.g. PCM 2.0). This down-mixing (e.g. via summation) results in lost audio information (e.g. bass and dynamic range) that can limit the sound quality of a supplemental sound system that uses a TV's audio output as an input signal.

SUMMARY

In one aspect, a method for automatically switching an audio source includes the steps of receiving an audio signal from a video display device, and receiving a digital audio signal from one of a plurality of audio/video source devices which each can supply audio and video information to the video display device. The digital audio signal is compared with the audio signal from the video display device. The digital audio signal is output to a supplemental audio system of the video display device when the comparing step indicates that the digital audio signal and the audio signal from the video display device contain substantially similar audio programs.

Embodiments may include one or more of the following features. The audio signal received from the video display device is an analog signal. The audio signal received from the video display device is a digital signal. The video display device is a television. The audio signal received from the video display device is supplied to the video device from one of the audio/video source devices. The digital audio signal received from the source device has 6 or more channels. The digital audio signal received from the source device has more channels than the audio signal received from the video display device. The receiving step includes receiving a digital audio signal from each of the plurality of audio/video source devices. The comparing step utilizes information beyond what is included in the audio signal and digital audio signal. The information that is beyond what is included in the audio signal and digital audio signal includes the presence or absence of a wireless signal from a remote control.

In another aspect, an apparatus for automatically switching an audio source includes an audio receiver that can receive (a) an audio signal from a video display device, and (b) a digital audio signal from one of a plurality of audio/video source devices which each can supply audio and video information to the video display device. The audio receiver compares the digital audio signal with the audio signal from the video display device and outputs the digital audio signal to a supplemental audio system of the video display device when the digital audio signal and the audio signal from the video display device contain substantially similar audio programs.

Embodiments may include one or more of the following features. The audio signal received from the video display device is an analog signal. The audio signal received from the video display device is a digital signal. The video display device is a television. The audio signal received from the video display device is supplied to the video device from one of the audio/video source devices. The digital audio signal received from the source device has 5 or more channels. The digital audio signal received from the source device has more channels than the audio signal received from the video display device.

In yet another aspect, a method for automatically switching an audio source includes the steps of receiving a digital audio signal from one of a plurality of audio/video source devices which each can supply video information to a video display device, and receiving an indication from the video display device that the digital audio signal should be transmitted to a supplemental audio system. The digital audio signal is output to the supplemental audio system.

An embodiment may include the following feature. The indication is an audio signal that substantially matches the digital audio signal.

DETAILED DESCRIPTION

Many consumers choose to add a supplemental audio system for use with their video display (e.g. a TV) to provide enhanced audio reproduction while watching a video program on their video display. The disclosure below discusses how to automatically switch the highest quality audio signal to the supplemental speaker system when A/V sources (e.g. DVD player, cable box) are directly connected to the TV.

Figure 1:
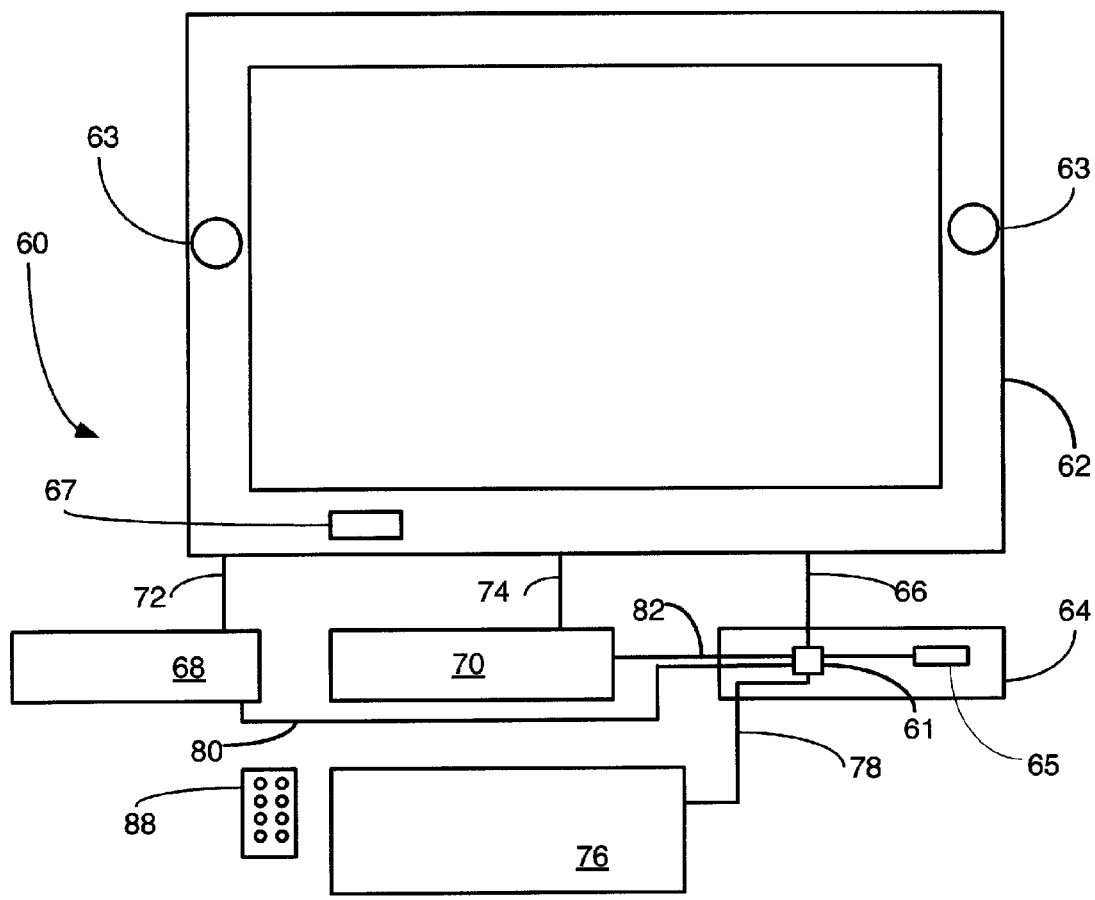
FIG. 1 is schematic arrangement of an audio/video system.

FIG. 1 discloses an audio/video system 60 which includes a video display device 62 such as a liquid crystal or plasma display. The display 62 includes integrated speakers (acoustic drivers) 63 and an infra-red (IR) receiver 67. A pair of audio/video source devices, such as a cable box 68 and a digital video disc (DVD) player 70, are attached to the display 62 by, for example, respective HDMI cables 72 and 74. Additional A/V source devices can be connected to the display 62. Any of the A/V source devices can be connected to the display 62 by an analog connection (e.g. component video with a separate audio connection) instead of a digital connection (e.g. HDMI). The A/V source devices can each supply audio (e.g. Dolby Digital 5.1 with six channels) and video information to the display 62. Another example of an A/V device that can be connected to the display 62 is a computer (not shown). The display 62 can also be connected directly to the internet which can supply A/V information to the display for presentation. Use is made of a source switching capability included in the display 62 to select AV information from A/V device 68 or 70 to present to the user. The user operates a wireless remote control 88 (e.g. IR or RF) to transmit a signal to the IR receiver 67 to select the desired A/V information from device 68 or 70 for presentation by the display 62. Alternatively, the user can operate buttons on the display 62 to select the desired A/V device 68 or 70.

The display outputs an audio signal over a cable 66 to an audio receiver 64. The information in the output audio signal was supplied to the display 62 by the selected A/V device 68 or 70. If cable 66 is a digital audio cable (such as optical or coaxial digital audio), then the output audio signal is in digital form (likely a PCM 2.0 signal). If cable 66 is a traditional stereo audio cable pair, then the audio signal output by display 62 is in analog form. The output audio signal is transmitted over cable 66 and received by a controller 61 in an audio receiver 64. The controller 61 is also connected to and can receive respective digital audio signals from the cable box 68 and DVD player 70 over respective digital audio cables 80 and 82. The audio signal output to the controller 61 by each of the cable box 68 and the DVD player 70 would typically be a high quality, multichannel digital audio signal (e.g. a Dolby Digital 5.1 audio signal). These high quality digital audio signals can provide a higher quality acoustic performance than the audio signal output by the display 62 over cable 66 because the latter is usually down-mixed. The reason the display 62 down-mixes the received audio signals is to optimize the audio output from the integrated speakers 63. Speakers 63 typically have significantly reduced performance as compared to an external audio system, and therefore the downmixed signals are sometimes greatly reduced in dynamic range and spectral extension. This downmixed signal cannot provide the dynamic range and bass performance that can be provided by the high quality digital audio signals provided directly from the AV sources 68 and 70.

A supplemental speaker system 76 is connected to the controller 61 of the audio receiver 64 by a cable 78. The speaker system 76 may have only a single acoustic driver (mono audio), or it may have multiple acoustic drivers arranged in, for example, a stereo, 5.1 or 7.2 audio system. A 5.1 system has the following speakers: left front, center, right front, left surround, right surround and bass (low frequency effects). The speaker system could also be a 1.0 or 1.1 type of system which is sometimes referred to as a "soundbar" (with or without a separate bass speaker). The speaker system preferably includes audio processing (such as a digital signal processor) and one or more power amplifiers As such, in an alternative example (not shown) the audio receiver 64 and the supplemental speaker system 76 can be combined into a single unit in which the functions of the controller 61 are performed by the audio processor of the speaker system 76. This type of arrangement can result in reduced costs for the entire system.

Figure 2:
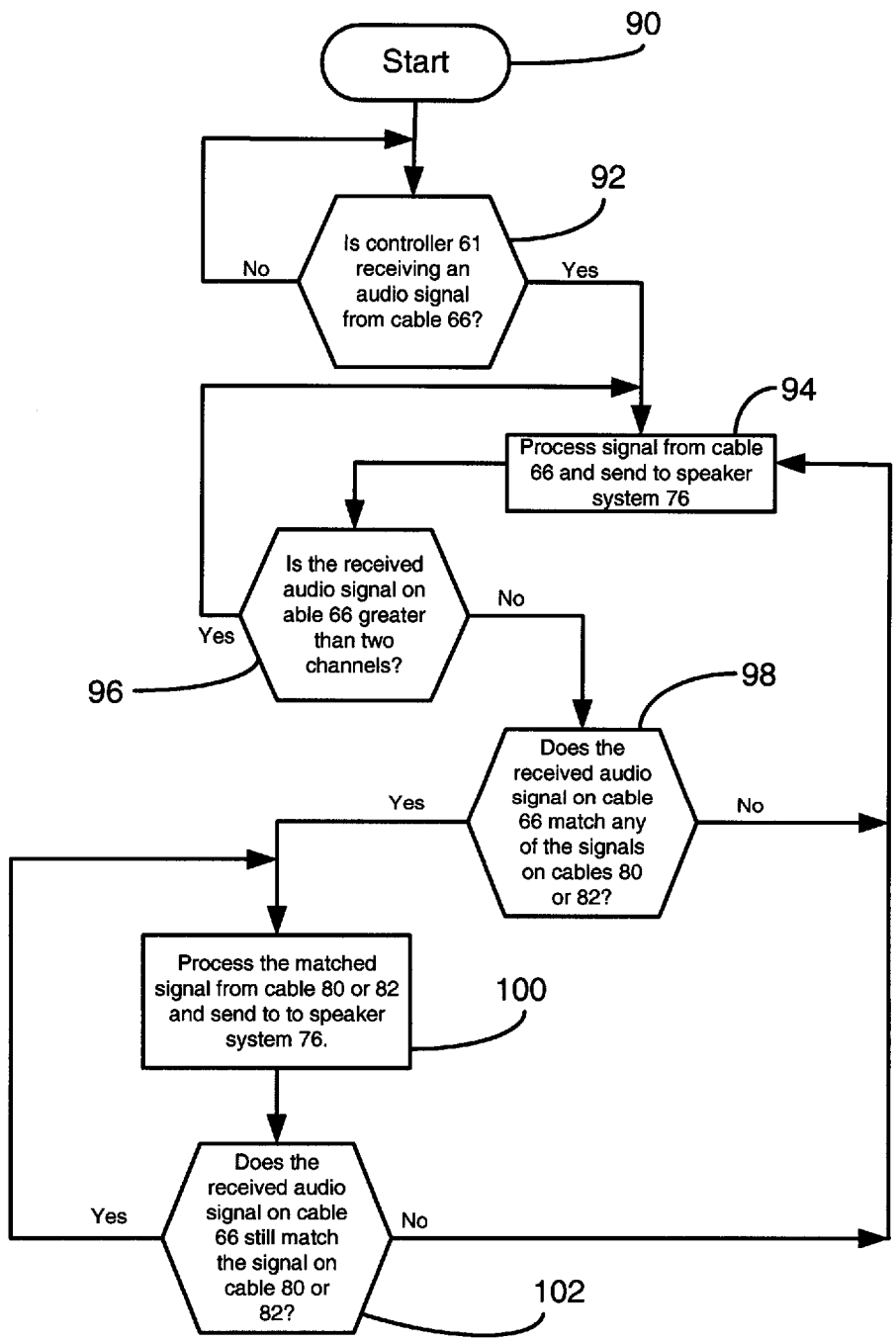
FIG. 2 is a flow diagram.

Referring now to FIGS. 1 and 2, the logic used by the controller 61 to provide the best available audio signal to the supplemental speaker system 76 will be described. Once the audio receiver 64 is powered up, the subroutine in FIG. 2 starts at a step 90. At a step 92 the controller 61 checks to see if it is receiving an audio signal from the display 62 over the cable 66. When a signal is being received, the controller 61 decodes and processes this signal as required and passes it to the speaker system 76 over cable 78 at a step 94. This step provides audio output while the controller 61 is checking to see if there is a higher quality (multi-channel) audio signal available directly from the A/V sources 68 and 70. At a step 96 the controller 61 checks to see if the received audio signal on cable 66 contains greater than two channels. When the signal on cable 66 is greater than two channels, this signal is continued to be processed and sent to the speaker system 76 as it is a multi-channel signal. If the received audio signal from cable 66 is a mono or two channel signal, then controller 61 compares this signal with the respective digital audio signals, if any, being received from cables 80 and 82 (and decoded) to look for a match between the signal on cable 66 and one of the signals on cables 80 and 82 (step 98). In other words, the controller 61 determines if the audio program on cable 66 is substantially similar to any of the audio programs on cables 80 and 82. When the signal on cable 66 does not match any of the signals on cables 80 or 82, the signal on cable 66 is continued to be processed and sent to the speaker system 76.

The matching of signals described at the end of the previous paragraph can be done as follows. The controller 61 looks for matching characteristics between the signal on cable 66 and each of the signals on cables 80 and 82. Matching characteristics can be refined and specifically made insensitive to the expected differences between the mono or two channel signal on cable 66 and the multi-channel signals which may be present on each of cables 80 and 82. These differences include that the signal on cable 66, if digital, will likely (a) not include a low frequency effects (LFE) channel, (b) have experienced dynamic range compression, and (c) have been downmixed from a multi-channel signal to a two channel or mono signal. The effects of down-mixing can be compensated for by calculating the acoustic energy sum over all channels for each signal being compared (down-mixing is approximately energy conserving). The short term spectrum of the energy sum for each signal is compared. The likely absence of a LFE channel in the signal on cable 66 can be compensated for by ignoring frequency content below 120 Hz in the signals on cables 80 and 82. Likely dynamic range compression of the signal on cable 66 can be compensated for by evaluating the positions in time of energy changes and not the energy changes themselves.

When the audio program on cable 66 substantially matches the audio program on one of cables 80 and 82, the controller 61 transitions (e.g. by cross-fading) the audio signal output to the supplemental audio system 76 over cable 78 from the signal on cable 66 to the matched signal on cable 80 or 82 (step 100). This transition from a "search phase" to a "matched phase" may take a relatively long amount of time as the audio signal on cable 66 should be properly paired with the video being presented on the display 62. In other words, the controller 61 does not have to be very fast at detecting a match between the signal on cable 66 and one of the signals on cables 80 and 82 because the system can play the signal on cable 66 in the meantime with confidence that the video and audio being played will match. Care should be taken during this transition to minimize or eliminate any switching audio artifacts (e.g. popping). The energy sum over all channels for each signal (mentioned in the previous paragraph) can be used to match the loudness between the audio signal (stream) on cable 66 and the audio signal (stream) on cable 80 or 82 at the transition (switching) time. Cross-correlation in time between the audio signal on cable 66 and the audio signal on cable 80 or 82 can determine a time lag (if any) between the two audio signals. An appropriate delay can then be applied by the controller 61 to time align the two audio signals before making the transition.

At a step 102 the controller 61 checks to see if the audio signal being received on cable 66 still matches the same signal on cable 80 or 82. This matching check is done as was explained two paragraphs above. When the match continues, the logic loops back to step 100 and checks for this match again. When this match no longer exists, the logic loops back to the start of the subroutine to the step 92. This subroutine continues to run until the audio receiver is powered down. This transition from the matched phase to the search phase (moving from step 102 to step 94) should occur relatively quickly. Typically, this transition is caused by an A/V source switch by a user of the A/V system 60 (e.g. switching from the cable box 68 to the DVD player 70). In order to keep the video and audio matched, the transition back to using the audio signal on cable 66 (back to step 94) for rendering audio should occur as quickly as possible to minimize the amount of time that the video and audio do not match.

The two matching audio streams on cable 66 and one of cables 80 and 82 will typically not be fully identical, so the system makes judgments about the degree of similarity. This can be done, as discussed above, by calculating a quantitative measure of similarity and comparing this to a threshold. This method can be improved by taking non-audio signal information into account. One such piece of information is the presence or absence of wireless remote control activity which can be detected through, for example, an IR sensor 65. When IR activity is observed by the sensor 65, the system assumes an A/V source switch may be taking place and increases the threshold for audio signal matching. The system lowers this threshold when no IR remote signal is present.

Another way to describe the example shown in FIGS. 1 and 2 is as follows. The receiver 64 receives a digital audio signal over one of cables 80 and 82 from one of a plurality of audio/video source devices 68 and 70 which each can supply video information to a video display device 62 over respective cables 72 and 74. The receiver 64 receives an indication from the video display device 62 that the digital audio signal should be transmitted to a supplemental audio system 76. This indication is the audio signal that the receiver 64 receives over cable 66 from the display 62. When the audio signal on cable 66 and the digital audio signal substantially match, the digital audio signal is output to the supplemental audio system over a cable 78.

Figure 3:
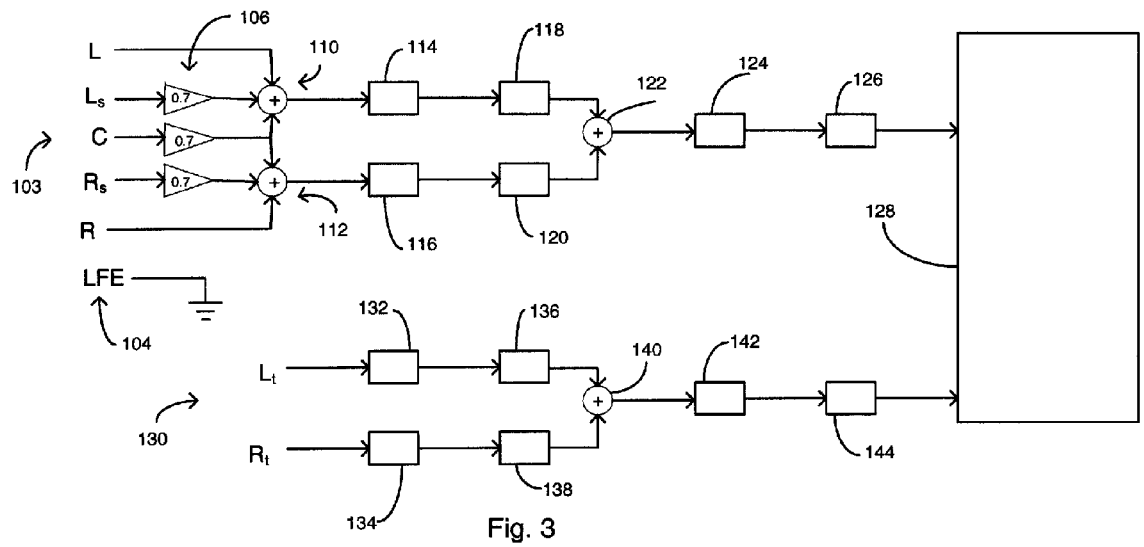
FIG. 3 is a signal cross-correlation circuit.
Figure 4:
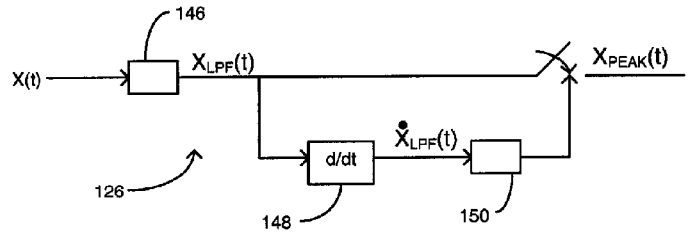
FIG. 4 provides more detail for the peak detector block of FIG. 3.
Figure 5:
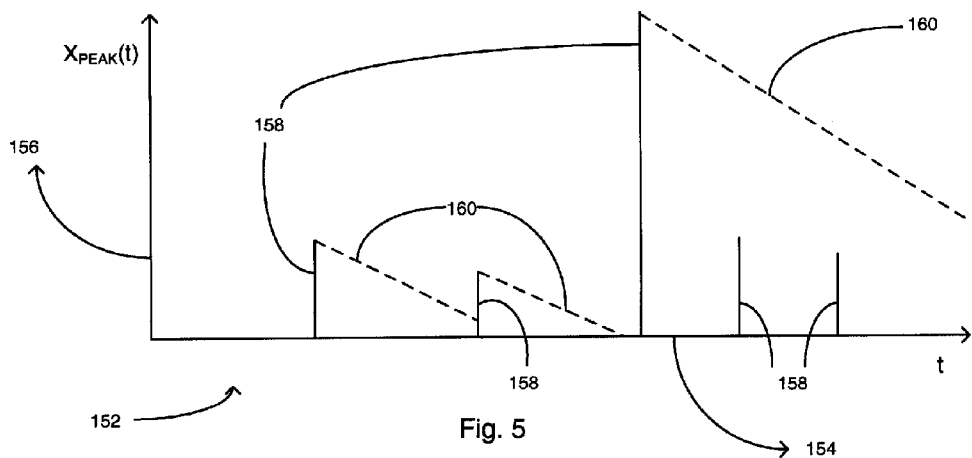
FIG. 5 is a graph demonstrating the detected peaks in a signal.
Figure 6:
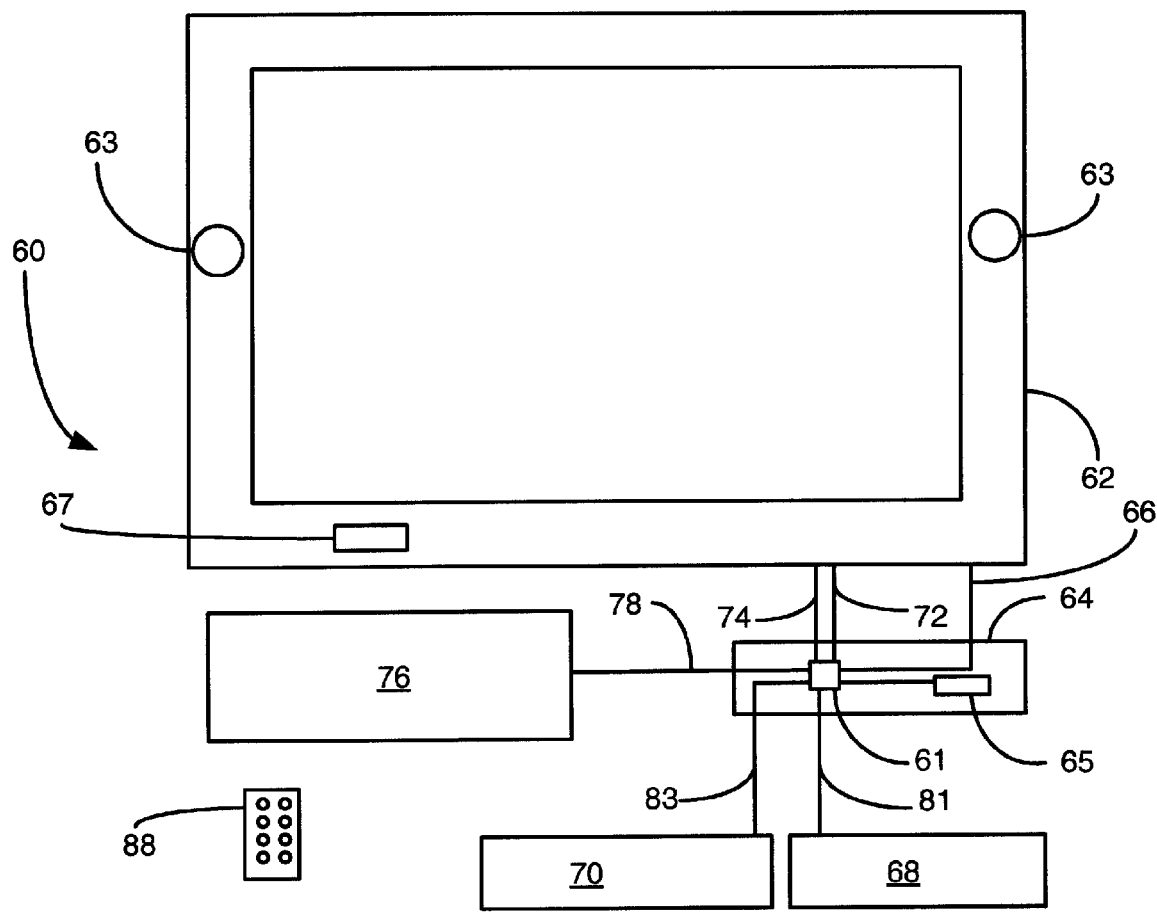
FIG. 6 is another example of an audio/video system.

Referring now to FIGS. 3-5, an example of how to compare a signal on cable 66 with a signal on cable 80 or 82 will be discussed. The following hardware and logic is preferably housed in receiver 64. In FIG. 3, a 5.1 channel signal 103 received over cable 80 includes the following components: L, $L_s$, C, $R_s$, R and LFE. The LFE (low frequency effects) signal 104 is discarded. The Ls, C and Rs are each passed through respective amplifiers 106 which each apply a 0.7 gain to their input signal. The L, $L_s$ and C signals are then passed to a summer 110 while the C, $R_s$ and R signals are passed to a summer 112. The signals out of summers 110 and 112 are respectively passed to bandpass filters 114 and 116 which each pass signals in about the 400 Hz to 10 kHz range. The signals out of filters 114 and 116 are each respectively squared in blocks 118 and 120. The signals out of blocks 118 and 120 are combined in a summer 122. The signal out of summer 122 has a square root function applied to it in block 124, and then a peak detector 126 (described in further detail below) operates on the signal. Finally, the signal out of the peak detector 126 is passed to a sparse cross-correlation block 128 (described in further detail below). It should be noted that a signal on cable 82 (FIG. 1) would receive similar signal processing as that described in this paragraph in a separate signal path (not shown) before being fed into block 128.

A two channel stereo signal 130 received over cable 66 includes the following components: $L_t$ and $R_t$. The Lt and Rt signals are respectively passed to bandpass filters 132 and 134 which each pass signals in about the 400 Hz to 10 kHz range. The signals out of filters 132 and 134 are each respectively squared in blocks 136 and 138. The signals out of blocks 136 and 138 are combined in a summer 140. The signal out of summer 140 has a square root function applied to it in block 142, and then a peak detector 144 (described in further detail below) operates on the signal. Finally, the signal out of the peak detector 144 is passed to the sparse cross-correlation block 128 (described in further detail below).

With reference to FIGS. 3 and 4, each of the peak detectors 126 and 144 described above operate as follows. In FIG. 4 a peak detector 126 is shown. A signal X(t) that is fed into the peak detector 126 is first low pass filtered at a block 146. This low pass filter is a $2^{nd}$ order Butterworth filter with a cutoff of about 1 kHz. The signal out of the filter 146 is given as $X_{LPF}(t)$. Then $X_{LPF}(t)$ is differentiated at a block 148 to obtain $X_{LPF}'(t)$. Anywhere that $X_{LPF}'(t)$ crosses zero by going from a positive number to a negative number corresponds to a peak in $X_{LPF}(t)$ (by definition of a derivative). As such, these zero crossings are used to locate the peaks of $X_{LPF}(t)$. The zero crossings or peaks as a function of time are determined in a block 150. The output of block 150 is used to control the transmission of $X_{LPF}(t)$. When a peak is detected, $X_{LPF}(t)$ is transmitted. When a peak is not detected, a stream of zeros is transmitted. This transmission of zeros and $X_{LPF}(t)$ results in $X_{PEAK}(t)$.

Turning to FIG. 5, in order to reduce the amount of data that needs to be processed, insignificant peaks are discarded. A graph 152 includes a "t" axis (time) 154 and an $X_{PEAK}(t)$ axis 156. The signal at this point is equal to the maximum points 158 of $X_{LPF}(t)$ at certain locations and zero everywhere else. Any small peaks that are preceded by large peaks are discarded. This is accomplished by using an exponentially decaying threshold 160. Whenever a peak is detected, the threshold is reset to that peak value. The threshold is then allowed to decay until another peak is found that exceeds the threshold. In this example the first three peaks from left to right are utilized because they are not less than the threshold 160. The last two peaks from left to right are discarded because they are less than the threshold 160.

Referring to FIGS. 3 and 5, the sparse cross-correlation block 128 utilizes an algorithm that receives from the peak detector 126 or 144 a sequence of numbers that correspond to the non-discarded peak values and locations (in time). The algorithm in block 128 uses this information to estimate the correlation between the stereo audio signal 130 on cable 66 and any multi-channel audio signal which may be present on cables 80 and 82 (FIG. 1).

The next step in the block 128 algorithm is normalization. Each frame of data received is made to have unit energy (i.e. $X_{norm}=X_{peaks} \div \|X_{peaks}\|$), where $\|X_{peaks}\|$ is the energy of $X_{peaks}$ i.e., it is the square root of the sum of the squares of $X_{peaks}$ found in a 100 milliseconds (ms) sample of the signal (called a frame of data). At this point in the block 128 algorithm, a multichannel audio signal on cable 80 or 82 is considered to not be correlated with the a stereo audio signal on cable 66 if the multichannel signal has (a) less than half the energy of the stereo signal, or (b) more than ten times the energy of the stereo signal. If a multi-channel audio signal is still a possible match with the stereo audio signal after normalization, the cross-correlation of the signals is approximated. Let Y[n] and X[n] be sampled data signals, where N is sample number. A cross-correlation is typically computed as:

$$Y[N]*X[-N] = \sum_{K=-N}^{N} Y[K]*X[N+K] \quad \text{(convolution equation)}$$

At this point, however, there are no time sequences: only the peak values and peak locations are known, so we cannot perform the cross-correlation as it is typically done and must approximate it using only the peak values and peak locations.

The benefit is that this greatly reduces the amount of computation that is needed. The cross-correlation of the multichannel signal and stereo signal is approximated as follows.
Let:
  $X_{51}$=peak values of a 5.1 (multichannel source) Mpeaks
  $X_{LR}$=peak values of a stereo audio source from a display N peaks
  $\tau_{51}$=time locations of peaks of a 5.1 source
  $\tau_{LR}$=time locations of peaks of a stereo audio source The convolution equation given above can be approximated as follows. First, compute all the cross-product terms by computing the outer product of the two vectors of peak values $$\begin{bmatrix} X_{51}[1] \\ X_{51}[2] \\ \vdots \\ X_{51}[M] \end{bmatrix} [X_{LR}[1] \ X_{LR}[2] \ \ldots \ X_{LR}[N]] =$$

$$\begin{bmatrix} X_{51}[1]X_{LR}[1] & X_{51}[1]X_{LR}[2] & \ldots & X_{51}[1]X_{LR}[N] \\ X_{51}[2]X_{LR}[1] & X_{51}[2]X_{LR}[2] & \ldots & X_{51}[2]X_{LR}[N] \\ \vdots & \vdots & & \vdots \\ X_{51}[M]X_{LR}[1] & X_{51}[M]X_{LR}[2] & \ldots & X_{51}[M]X_{LR}[N] \end{bmatrix}$$

Next, compute the time alignment value of each of the entries in the cross-product matrix above, $$\begin{bmatrix} \tau_{51}[1] \\ \tau_{51}[2] \\ \vdots \\ \tau_{51}[M] \end{bmatrix} \underbrace{[1 \ 1 \ \ldots \ 1]}_{1 \times N} - \underbrace{\begin{bmatrix} 1 \\ 1 \\ \vdots \\ 1 \end{bmatrix}}_{M \times 1} [\tau_{LR}[1] \ \tau_{LR}[2] \ \ldots \ \tau_{LR}[N]] =$$

$$\begin{bmatrix} \tau_{51}[1]X_{LR}[1] & \tau_{51}[1]-\tau_{LR}[2] & \ldots & \tau_{51}[1]-\tau_{LR}[N] \\ \tau_{51}[2]-\tau_{LR}[1] & \tau_{51}[2]-\tau_{LR}[2] & \ldots & \tau_{51}[2]-\tau_{LR}[N] \\ \vdots & \vdots & & \vdots \\ \tau_{51}[M]-\tau_{LR}[1] & \tau_{51}[M]-\tau_{LR}[2] & \ldots & \tau_{51}[M]-\tau_{LR}[N] \end{bmatrix}$$

1. Next, the entries of the above time alignment matrix are rounded so that the product terms that are within about 1 ms of each other are considered to be collocated.
2. Product terms that have the same time alignment are added together to create an approximation to the cross-correlation. If the peak of this cross-correlation is greater than 0.75 then the multichannel signal and stereo signal are considered to be matched for that frame.

If the controller 61 is currently sending the signal from cable 66 to the speaker system 76, the controller 61 will switch to sending the multichannel signal from cable 80 or 82 to the speaker system 76 if at least nine out of ten frames are considered to be matched (cross-correlated). If the controller 61 is currently sending a multichannel signal from cable 80 or 82 to the speaker system 76, the controller 61 will switch to sending the signal from cable 66 to the speaker system 76 if less than two out of ten frames are considered to be matched (cross-correlated).

In order for the signal matching described above with reference to FIGS. 3-5 to work well, the peaks extracted from the multichannel signal on e.g. cable 80 and the stereo signal on cable 66 should be time-aligned within about 100 ms. Typically the time delays are larger than this and it is necessary to estimate the time delays in parallel to the matching algorithm and adjust the time delays accordingly. This can be don by running a separate cross-correlation algorithm similar to the one discussed above is on a much larger frame size (e.g. about 1 second) to estimate the time alignment of the multichannel and stereo signals. The results of this time alignment determination set the delay values of variable time delay for the leading signal prior to being send to signal comparison block.

Turning to FIG. 4, another example will be described. Components in FIG. 4 that are similar to like components in FIG. 1 are given the same reference numerals as in FIG. 1. FIG. 4 discloses an audio/video system 60 which includes a video display device 62 that includes integrated speakers (acoustic drivers) 63 and an infra-red (IR) receiver 67. A pair of audio/video source devices, such as a cable box 68 and a digital video disc (DVD) player 70, are attached to an audio receiver 64 by, for example, respective HDMI cables 81 and 83. The A/V source devices can each supply a signal to the receiver 64 which includes video and audio information. A controller 61 in the receiver 64 receives the signals from cables 81 and 83 and passes the respective video information in the signals to respective cables 72 and 74 which are each connected to a video input of the display 62. In other words, the video information on cable 81 is passed over cable 72, and the video information on cable 83 is passed over cable 74. Use is made of a source switching capability included in the display 62 to select video information from A/V device 68 or 70 to present to the user. The user operates a wireless remote control 88 (e.g. IR or RF) to transmit a signal to the IR receiver 67 to select the desired video information from device 68 or 70 for presentation by the display 62. Alternatively, the user can operate buttons on the display 62 to select the desired A/V device 68 or 70.

Assume the user makes a selection of video information on cable 72 to present on the display 62 (a video sink). The display 62 and receiver 64 (a video repeater) will go through an HDCP "handshake" over HDMI cable 72. The controller 61 checks to see if it is receiving an audio signal from the display 62 over the cable 66. The subroutine shown in FIG. 2 and described above is then followed. Accordingly, the controller 61 takes audio information that it has received over cable 81 and passes the audio information to the supplemental audio system 76 over cable 78. In this way the audio is automatically switched to supplemental audio system 76 so that it matches the video that is being presented on the display 62.

Another way to describe the example shown in FIG. 4 is as follows. The receiver 64 receives a digital audio signal over one of cables 81 and 83 from one of a plurality of audio/video source devices 68 and 70 which each can supply video information to a video display device 62 over respective cables 72 and 74. The receiver 64 receives an indication from the video display device 62 over cable 66 that the digital audio signal should be transmitted to a supplemental audio system 76. The digital audio signal is output to the supplemental audio system over a cable 78.

A number of implementations have been described. Nevertheless, it will be understood that additional modifications may be made without departing from the spirit and scope of the inventive concepts described herein, and, accordingly, other embodiments are within the scope of the following claims.

What is claimed is:

1. An apparatus for automatically switching an audio source, comprising: an audio receiver that can receive (a) an audio signal from a video display device, and (b) a digital audio signal from each of a plurality of audio/video source devices which each can supply audio and video information to the video display device, wherein the audio receiver compares each of the digital audio signals with the audio signal from the video display device and outputs one of the digital audio signals to a supplemental audio system of the video display device when that digital audio signal and the audio signal from the video display device contain substantially similar audio programs, the audio receiver utilizing the presence or absence of a wireless signal from a remote control when comparing each of the digital audio signals with the audio signal from the video display device.

2. The apparatus of claim 1, wherein the audio signal received from the video display device is an analog signal.

3. The apparatus of claim 1, wherein the audio signal received from the video display device is a digital signal.

4. The apparatus of claim 1, wherein the video display device is a television.

5. The apparatus of claim 1, wherein the audio signal received from the video display device is supplied to the video device from one of the audio/video source devices.

6. The apparatus of claim 1, wherein the digital audio signal received from the source device has 5 or more channels.

7. The apparatus of claim 1, wherein the digital audio signal received from the source device has more channels than the audio signal received from the video display device.

* * * * *